UNITED STATES PATENT OFFICE.

EBEN C. QUINBY AND JOSEPH C. WHITING, OF ST. LOUIS, MISSOURI.

IMPROVEMENT IN PROCESSES OF ENAMELING IRON-WARE.

Specification forming part of Letters Patent No. 193,422, dated July 24, 1877; application filed June 21, 1877.

*To all whom it may concern:*

Be it known that we, EBEN C. QUINBY and JOSEPH C. WHITING, assignors to ourselves and WILLIAM W. ATER and JAMES J. SYLVESTER, all of the city and county of St. Louis and State of Missouri, have invented a new and useful Process of Enameling Wrought or Sheet Iron Ware, by means of which a more durable and a beautifully mottled or marbled enamel is obtained, of which the following is a full, clear, and exact description.

The prime consideration of a good enamel for wrought or sheet iron wares—more particularly for household purposes, to which our invention is chiefly applicable, though we do not confine it to these—is durability, which is referable, first, to its adhesiveness, whereby it clings to the iron and resists separation from it; and, second, to the thinness of the enamel, which renders it more pliable, and, consequently, less liable to break or check when the iron and itself are subjected to strain, by accident or otherwise. Beauty of color or ornament and brilliancy of finish are secondary considerations not to be disregarded, but still not to be sought after at the expense of durability.

And the chief object of our invention is to secure in enameled wrought or sheet iron ware both durability and beauty to a degree not heretofore reached, and by operations simpler and more direct, as we believe, than heretofore practiced in the art of enameling on wrought or sheet iron. Said art, as most commonly conducted, contemplates the employment of two or more coats of enamel—to wit, a body coat prepared especially with the view to unite the iron with itself, and a second coat, which second coat is usually colored with some metallic oxide, and is intended to impart finish and ornament to the article, with often a third coat over both these, especially adapted for glazing or imparting polish to the whole, and which process of enameling comprehends many repetitions not necessary in our process, and gives an inferior enamel coating.

And our process has to do with the composition of an enamel glass or crystal, and also our manner of applying the same with other ingredients as a coating to sheet-iron ware.

And, first, as to the composition of our enamel glass or crystal, take silica, one hundred pounds; soda-ash, thirty-five pounds; borax, seventy-five pounds; plaster-paris or gypsum, twenty pounds, or ten to twenty pounds; and arsenious acid in the proportion of one and one-eighth per cent. of all the other ingredients, or about two and a half pounds in two hundred and thirty pounds. These proportions may be varied to some extent without departing from our invention; but we prefer those given, as we have found them to work well. When these are compounded, as hereinafter set forth, the resultant is an enamel glass or crystal vitreous enough to carry a glaze of itself, with an affinity for wrought or sheet iron which causes it to adhere thereto with extreme tenacity when burned upon it, and which will not exfoliate or absorb moisture in quantity sufficient to destroy its polish.

Such of the above-mentioned ingredients of our enamel glass or crystal as require it having been comminuted, all are carefully mixed together and brought to a state of complete vitrification in a reverberatory oven, with observance of the rules applicable to glass-making generally. This done, the enamel glass or crystal is run off into cold water when it is ready for grinding.

For making an enamel for wrought or sheet iron ware, we take, say, one hundred pounds of this enamel glass or crystal, and grind the same in an ordinary so-called "porcelain-mill," adding thereto about five (5) pounds of clay, preferably white, and having a pronounced soapy feeling, which clay helps to give body to the enamel, and to prevent its crazing when it is finally fixed on the iron in the heat of a muffle. This grinding process requires about one working-day, but should always be continued until the enamel glass or crystal is thoroughly ground, and the clay thoroughly mixed with it.

In most or all cases we have further found that it is best to introduce along with the enamel glass and clay, in the grinding process, calcined carbonate of magnesia, in the proportion of eight ounces to one hundred pounds of the enamel glass. This salt of magnesia serves to make the enamel coat, as finally applied, less transparent, and contributes, we believe, to the flecking or spotting of it with white, and thus, in a measure, prevents the iron base from imparting to the enamel coat its own dull and unattractive shade.

Prepared as above set forth, the mixture is run off through a strainer into tubs, where it is allowed to remain about one day, during which time a sort of ripening is effected, when it is finally prepared, as follows: The mixture being brought to about the consistency of cream by the addition, when necessary, of water, sulphate of magnesia is added until the consistency of the mixture is such that it will no longer run like water upon the surface of the article when applied, or upon the surface of the mixing-spoon, but is coagulated and pasty, yet still capable of being shaken out into a thin and uniform coat. Two ounces of sulphate of magnesia we have usually found sufficient for one hundred pounds of the mixture; and if, as sometimes happens during the coating process, the paste or mixture becomes thin and watery, we carefully remove as much of the water as rises to the surface during a little intermitting of the dipping process, and then bring the paste to a proper consistency again by the application, as set forth above, of sulphate of magnesia. The same result may be measurably accomplished by the use of sulphate of magnesia in the mill during the grinding process.

When the grinding operation is intermitted, say at the noon-hour, the tendency of the ingredients in the mill being to settle rapidly, the upper stones, which, in said operation, are drawn over the lower or bed stone by bent arms, are apt to become clogged, in which case the mill is again started with difficulty. To avoid this the grinding operation is usually made continuous until it is completed.

We make this continuous operation unnecessary by the introduction into the mixture of a small quantity of sulphate of magnesia; and while we thus accomplish this desirable result, we help to secure the consistency necessary for the final application of the enamel coat.

The mixture having been finally prepared, as above set forth, we dip into it the wrought or sheet iron article to be enameled, the same having been first prepared by the well-known processes of annealing, pickling, scouring, and washing.

Care should be taken that the enamel coating be not laid on too heavily, and that it be evenly distributed. Any inequality of coating gives inequality of contractile and expansive powers, and consequently increases liability of fracture.

When the coating is heavily laid on, though evenly distributed, still the chipping or breaking of it is easy, its elasticity is materially lessened, and its color will be nearly a uniform gray. It is apt also to show seams or ridges when dry, which must be rubbed out carefully with the fingers, or a ball of some soft material—as, for instance, cotton—before submitting it to the heat of the muffle.

Having been given a thin uniform coat by dipping, the article so coated is dried, for if the enamel coat is burned while still wet or damp it will crack or craze. This drying we accomplish, for convenience and dispatch, in an oven constructed for the purpose, the range of heat in which varies from about 100° to 170° Fahrenheit; but the drying may be accomplished even at summer heat in an ordinary close room.

One of the objects in the art of enameling wrought or sheet iron ware is to produce a beautifully mottled or spotted enamel coat; and to this end we find it assists us in the imparting of a variety to such ware to vary the temperature at which the drying is accomplished within the range as above set forth. The higher the temperature the smaller and less distinct the spots; the lower the temperature the more pronounced the mottlings. The time required will obviously depend upon the thickness and moisture of the enamel coat, and upon the degree of heat employed. When thoroughly dried the coat is of a whitish color, either brown-spotted, or reddish-brown-spotted, or mottled, and when burned in a muffle, of a grayish color, dark-spotted, or dark and light spotted, or mottled. And with reference to this spotting or mottling, all wrought or sheet iron used for enameling purposes is more or less covered by rust, or oxide of iron. By the well-known operations of pickling and cleaning we remove as much as we can of this; but such iron has a very delicate and closely-adherent film of oxide hardly distinguishable, and not in appearance like a common rusted surface, portions of which usually remain after the cleansing process, and at the time the ware is dipped. During the dipping and drying processes these portions or films of oxide become hydrated, as we believe, owing to the presence of moisture, the soluble salt or salts in the enamel coating, and by reason of the heat of the drying-room, and they assume, in consequence, a distinct brownish tinge, which is taken up by or penetrates into the enamel coating, and thus produce spots or mottles, which are more determinedly brought out and burned black or dark by the burning process.

The burning process is effected in an ordinary muffle, at a red or cherry heat, or a little above, the ordinary time required being about four minutes. The result is a beautifully-mottled enamel coat, and one also which sticks to the iron base with great tenacity.

And as to this quality of tenacity, we find that if we leave out of our enamel glass the arsenious acid which we name above as one of the ingredients, the enamel coat resulting from careful following of all the other steps of our process, as hereinbefore set down, will not have the adhesive quality necessary to a good enamel, and as a consequence will be of less value for our purposes. And we have found, in practice, that a quantity about as we specify—to wit, two and a half pounds to one hundred of silica, or to two hundred and thirty pounds of all the other ingredients of the enamel glass—gives us an enamel of the required quality.

We make no claim to this ingredient as commonly used in such quantity only as will remove the green stain given to glass or enamel glass by the iron present in its ingredients.

Successive burnings, rendered necessary by successive coats of enamel, diminish the tenaciousness of our enamel; but whether this is on account of the partial volatilization of the arsenious acid or the devitrification which successive heatings and coolings are known to produce in glasses generally, we cannot say. But one coat and one burning is best as a general rule, and is an important point in the process of enameling wrought or sheet iron ware.

Having described our invention, what we claim in the process of enameling wrought or sheet iron ware is—

1. The enamel glass or crystal composed of silica, borax, soda, plaster-paris, and arsenious acid, substantially as and for the purposes set forth.

2. The combination, with the enamel glass or crystal composed of silica, borax, soda, plaster-of-paris, and arsenious acid, of clay, substantially as and for the purpose set forth.

3. The combination of carbonate of magnesia with the enamel coat, composed of silica, borax, soda, plaster-of-paris, and arsenious acid, and clay, substantially as and for the purposes set forth.

4. Sulphate of magnesia in the process of enameling sheet-iron ware, for the purpose of keeping the enamel glaze or coating in proper condition for dipping, substantially as set forth.

5. Arsenious acid in the process of enameling sheet-iron ware, for the purpose of causing a more tenacious adherence of the enamel to the iron, in the proportions substantially as set forth.

6. In the process of manufacturing sheet metal mottled enameled ware, developing the mottles by heat and moisture in the presence of a soluble salt or salts incorporated in the enamel coating, as described, whereby the oxide remaining upon the surface of the coated metal is acted upon, substantially as described, after the said surface has been pickled and cleaned.

7. The process of enameling sheet-iron ware consisting of the making of an enamel glass or crystal by the complete vitrification of silica, borax, soda, plaster-of-paris, and arsenious acid; the running of the same, when so vitrified, into water; the grinding of the same in water, with admixture of clay and calcined carbonate of magnesia; the straining and ripening of the resulting mixture; the treatment of the same with sulphate of magnesia, either in the mixing-pan or the mill, or in both; the coating with the same when thus treated of the annealed and cleaned sheet or wrought iron surface; the drying of the coated article, and the burning in the muffle, all substantially as set forth.

EBEN C. QUINBY.
JOSEPH C. WHITING.

Witnesses:
WM. S. FOWLER,
A. J. GERHARD.